June 25, 1946.   J. D. JENSSEN   2,402,895
MEANS FOR ABSORBING RELIEF GASES FROM
SULPHITE PULP DIGESTERS
Filed June 17, 1944   2 Sheets-Sheet 1

INVENTOR
Jacob D. Jenssen
By E. N. Fetherstonhaugh.
ATTORNEYS.

Patented June 25, 1946

2,402,895

UNITED STATES PATENT OFFICE 2,402,895

MEANS FOR ABSORBING RELIEF GASES FROM SULPHITE PULP DIGESTERS

Jacob Darre Jenssen, New York, N. Y., assignor to G. D. Jenssen Company, Incorporated, New York, N. Y.

Application June 17, 1944, Serial No. 540,878
In Canada March 12, 1943

1 Claim. (Cl. 92—7)

The invention relates to means for absorbing relief gases from sulphite pulp digesters as described in the present specification and illustrated in the accompanying drawings that form a part of the same.

The invention consists of introducing a means between the digesters and the acid system for controlling the volume of gas to the system as pointed out broadly and specifically in the claims for novelty following a description containing an explanation in detail of the acceptable forms of the invention.

The objects of the invention are to mimimize the fluctuation of the volume of gas, such fluctuation occurring during the cooking period for the sulphite pulp with bisulphite acid which ordinarily results in an even absorption of the gas in the acid from the acid system; to ensure constant flow of gas to the acid system; to effect uniform operation of the acid system; to decrease the loss of $SO_2$ in the gas relieving the acid system; to increase the capacity of the acid system; to devise an approximate even absorption of the relief gases; and generally to provide means for controlling the volume of gas for even or approximately even distribution to the system.

Figure 1:
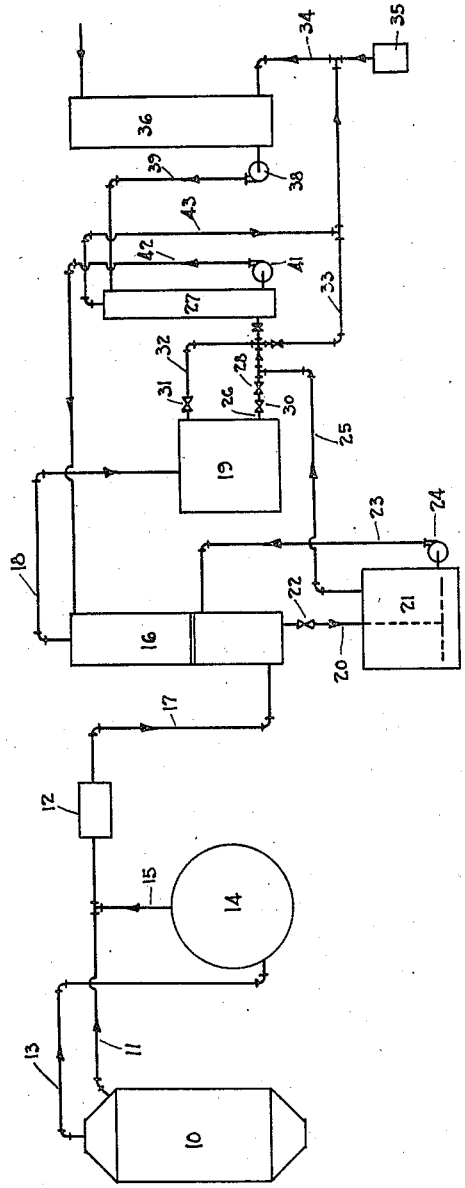
Figure 1 is a diagrammatic view of the system.
Figure 2:
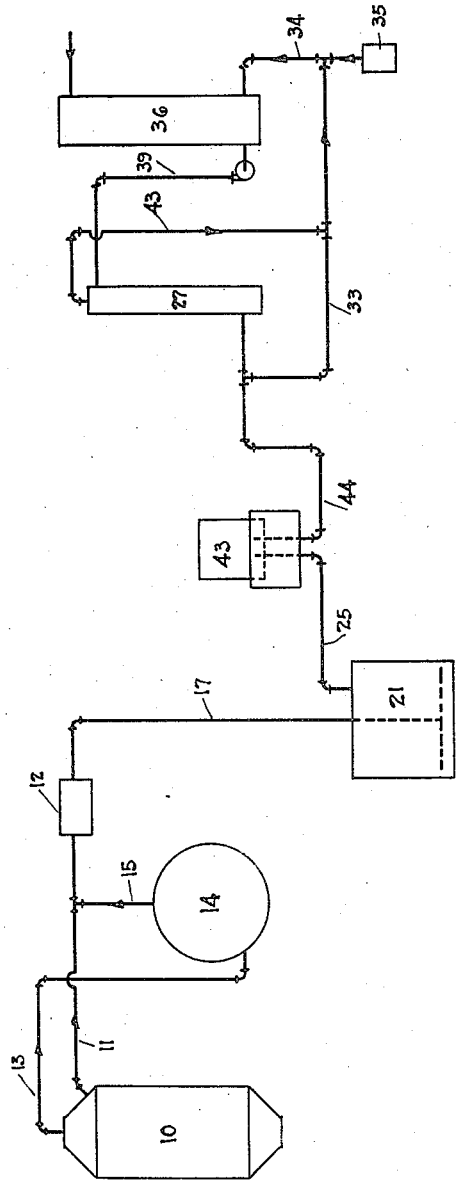
Figure 2 is a modification of the system as illustrated in Figure 1.

Like numerals of reference indicate corresponding parts in the various figures. Referring to the drawings, the digester which is adapted to contain the wood chips, etc., is indicated by the numeral 10 and has a direct pipe connection 11 to the cooler 12, as well as a direct pipe connection 13 to the hot acid tank 14, the hot acid tank 14 having the returned pipe connection 15 to the pipe connection 11 which leads to the cooler 12.

The cooler 12 is connected to the pressure absorption tower 16 by the pipe 17, this pressure absorption tower being packed with inert material, the absorption tower 16 is provided with two outlets, one approximately adjacent to the top of the tower and the other being approximately at the bottom thereof, in the former case the outlet is provided with a pipe connection 18 which leads into the gas holder 19 and in the latter case the outlet is provided with a pipe connection 20 leading into the acid storage tank 21, this pipe connection 20 being controlled by means of a valve 22.

The acid storage tank is provided with two outlets, one outlet having a returned pipe connection 23 leading back into the lower portion of the pressure absorption tower 16, the pump 24 being connected to the pipe 23 to facilitate the recirculation of a certain amount of the acid that is in the storage tank 21 in order to absorb more $SO_2$ in the acid. The other outlet of the acid storage tank is connected by a vent pipe 25 to the pipe 26 which connects the gas holder 19 to the low pressure absorption tower 27, this pipe 26 is provided with reducing valves 28 and 29, as well as, the flow control 30 through which the gases in the gas holder will flow before it reaches the reducing valves. The low pressure absorption tower is provided with a packing of inert material.

In order that the pressure in the pressure gas holder 19 shall be maintained at an approximately predetermined limit and not to exceed the limited pressure desired, an automatic back pressure valve 31 is introduced and connected through the pipe 32 to the pipe 26, the pipe 32 emanating from the gas holder 19.

The by-pass pipe 33 is connected to the pipe 34 leading from the sulphur dioxide plant 35. The pipe 34 is connected to the bisulphite acid making system 36, the latter being provided with the usual water pipe 37 to allow water to enter for acid making and the acid from the bisulphite system 36 is pumped through the pump 38, through the pipe 39 to the low pressure absorption tower 27, flows through the pipe 40 to the pipe 33, while the acid from the absorption tower 27 is pumped through the pump 41, through the pipe 42 to the pressure absorption tower 16 in the modified system. If it is not desired to use a pressure absorption tower, a wet seal gas holder 43 is used and the cooler 12 is connected by a pipe 17 to the acid storage tank 21 and the acid storage tank is in turn connected by pipe 25 to the wet seal gas holder 43, and the gas from the gas holder 43 is fed through the pipe 44 to the low pressure absorption tower 27 and the rest of the system as hereinabove described is included in the modification.

It is of course understood that where no other acid tank is provided for, both the high pressure relief and the low pressure for the digester are connected to the high pressure absorption tower and if the pressure absorption tower is omitted and the relief gases are partly absorbed in the storage tank, the wet seal gas holder as hereinabove described may be introduced in the vent pipe between the storage tank and the low pressure absorption tower in order to obtain an even flow of gas.

During the cooking of sulphite pulp with bisulphite acid, a considerable amount of SO₂ gas is being relieved from the digester during the cooking of the wood. The amount of gas so relieved fluctuates during the cooking period and results in an uneven absorption of this gas in the acid from the acid system. By introducing a gas holder between the relief pipe from the digesters and the acid system the fluctuations in the volume of gas may be eliminated so that there will be a constant volume of gas to the acid system. From an operating point of view this is very important. It will result in a uniform operation of the acid system and also increase the capacity of the acid system.

In order to limit the size of the gas holder, an absorption tower, which may operate at a predetermined pressure, will accomplish this purpose. It is a well known fact that absorption of SO₂ in a liquid is in direct proportion to the pressure under which absorption takes place. The result will be that a much larger proportion of the SO₂ gas than hitherto has been possible will be absorbed in the acid at this point. This, of course, means that a smaller gas holder will be required.

In order to absorb the SO₂ still present in the gas holder, a low pressure absorption tower may be introduced, with the result that practically all SO₂ gas relieved from the digester has been absorbed in the acid from the acid system. This is an important feature for the control of the acid, especially in the summer when the temperature of the water for acid making is high.

I claim:

In means for absorbing relief gases from sulphite pulp digesters, a digester having feed lines to a cooler and a hot acid tank respectively, a return pipe connection from the hot acid tank to the feed line between the digester and the cooler, a feed line from the cooler to a pressure absorption tower, the latter having a feed line to a gas holder, an acid storage tank having a feed connection leading from the pressure absorption tower and a return connection thereto through a circulation pump, a feed line from the acid storage tank to the gas holder controlled by reducing valves, a low pressure absorption tower having a feed line from the acid storage tank and the gas holder and a return pipe to the pressure absorption tower, a sulphur dioxide plant connected to the gas holder and to the low pressure absorption tower, and a bisulphite acid making system connected to said sulphur dioxide plant and to the low pressure absorption tower.

JACOB DARRE JENSSEN.